United States Patent
Bedekar et al.

(10) Patent No.: US 11,419,161 B2
(45) Date of Patent: Aug. 16, 2022

(54) METHODS, APPARATUSES AND COMPUTER-READABLE STORAGE MEDIUMS FOR COORDINATED SELECTION OF RAN AND CORE USER PLANE COMPONENTS IN A WIRELESS COMMUNICATIONS NETWORK

(71) Applicant: Nokia Solutions and Networks Oy, Espoo (FI)

(72) Inventors: Anand Bedekar, Glenview, IL (US); Rajeev Agrawal, Glenview, IL (US); Paul Boudreaux, Plano, TX (US); Eric Desorbay, Campbon (FR)

(73) Assignee: Nokia Solutions and Networks Oy, Espoo (FI)

( * ) Notice: Subject to any disclaimer, the term of this patent is extended or adjusted under 35 U.S.C. 154(b) by 34 days.

(21) Appl. No.: 16/969,822

(22) PCT Filed: Feb. 15, 2018

(86) PCT No.: PCT/US2018/018336
§ 371 (c)(1),
(2) Date: Aug. 13, 2020

(87) PCT Pub. No.: WO2019/160549
PCT Pub. Date: Aug. 22, 2019

(65) Prior Publication Data
US 2020/0374946 A1 Nov. 26, 2020

(51) Int. Cl.
| | |
|---|---|
| *H04W 76/10* | (2018.01) |
| *H04W 88/08* | (2009.01) |
| *H04W 92/14* | (2009.01) |
| *H04W 92/24* | (2009.01) |

(52) U.S. Cl.
CPC .......... *H04W 76/10* (2018.02); *H04W 88/085* (2013.01); *H04W 92/14* (2013.01); *H04W 92/24* (2013.01)

(58) Field of Classification Search
None
See application file for complete search history.

(56) References Cited

U.S. PATENT DOCUMENTS

| | | |
|---|---|---|
| 2003/0112788 A1 | 6/2003 | Erhart et al. |
| 2017/0075552 A1* | 3/2017 | Berenbaum ........... G06F 3/0482 |

(Continued)

FOREIGN PATENT DOCUMENTS

| | | |
|---|---|---|
| WO | WO-2017/110650 A1 | 6/2017 |
| WO | WO-2017/141749 A1 | 8/2017 |

(Continued)

OTHER PUBLICATIONS

3GPP technical report 38.806, "3rd Generation Partnership Project; Technical Specification Group Radio Access Network; Study of separation of NR Control Plane (CP) and User Plane (UP) for split option 2; (Release 15)", Jan. 2, 2018 (Jan. 2, 2018); [retrieved from online on Apr. 11, 2018, (Apr. 11, 2018)), [Retrieved from URL: https://portal.3gpp.org/desktopmodules/Specifications/SpecificationDetails.aspx?specificationId =3307), entire document, especially, abstract, FIG.5.3-1, p. 6, Section 5.3.

International Search Report PCT/ISA/210 for International Application No. PCT/US2018/018336 dated Apr. 25, 2018.

Written Opinion of the International Searching Authority PCT/ISA/237 for International Application No. PCT/US2018/018336 dated Apr. 25, 2018.

(Continued)

*Primary Examiner* — Jamaal Henson
(74) *Attorney, Agent, or Firm* — Harness, Dickey & Pierce, P.L.C.

(57) ABSTRACT

A server associated with a core network may include a memory storing computer-readable instructions; and at least one processor coupled to the memory, the at least one processor configured to execute the computer-readable instructions to, generate a list of preferred instances of a first network function, transmit the list of the preferred instances to a server associated with a third network function, and receive a request to establish a communication session with a selected instance selected from the list of the preferred instances, if the server is associated with a selected instance of a second network function associated with the selected instance of the first network function.

19 Claims, 7 Drawing Sheets

(56) References Cited

U.S. PATENT DOCUMENTS

| | | | |
|---|---|---|---|
| 2017/0359848 A1 | 12/2017 | Tenny et al. | |
| 2019/0075552 A1* | 3/2019 | Yu | H04W 72/04 |
| 2020/0404073 A1* | 12/2020 | Huang | H04L 67/16 |

FOREIGN PATENT DOCUMENTS

| | | |
|---|---|---|
| WO | WO-2017/190783 A1 | 11/2017 |
| WO | WO-2018/009340 A1 | 1/2018 |
| WO | WO-2019078888 A1 * | 4/2019 |
| WO | WO-2019083522 A1 * | 5/2019 |

OTHER PUBLICATIONS

3GPP TR 29.891 V15.0.0: Technical Specification Group Core Network and Terminals; 5G System—Phase 1; CT WG4 Aspects (Release 15), Dec. 2017.

Ericsson, CP-UP separation—scenario and feasibility 3GPP TSG-RAN WG3 AH #2, R3-172535, Jun. 2017.

Partial Supplementary European Search Report dated Jul. 30, 2021, issued in corresponding European Patent Application No. 18905922.3.

3GPP TS 38.300 V2.0.0 (Dec. 2017), '3rd Generation Partnership Project; Technical Specification Group Radio Access Network; NR; NR and NG-RAN Overall Description; Stage 2 (Release 15).'

3GPP TS 38.401 V1.0.0 (Dec. 2017), '3rd Generation Partnership Project; Technical Specification Group Radio Access Network; NG-RAN; Architecture description (Release 15).'

3GPP TS 23.502 V2.0.0 (Dec. 2017), '3rd Generation Partnership Project; Technical Specification Group Services and System Aspects; Procedures for the 5G System; Stage 2 (Release 15).'

3GPP TS 23.501 V2.0.1 (Dec. 2017), '3rd Generation Partnership Project; Technical Specification Group Services and System Aspects; System Architecture for the 5G System; Stage 2 (Release 15).'

"Dynamic end-to-end network slicing for 5G—addressing 5G requirements for diverse services, use cases, and business models," Nokia White Paper, published Dec. 2016.

* cited by examiner

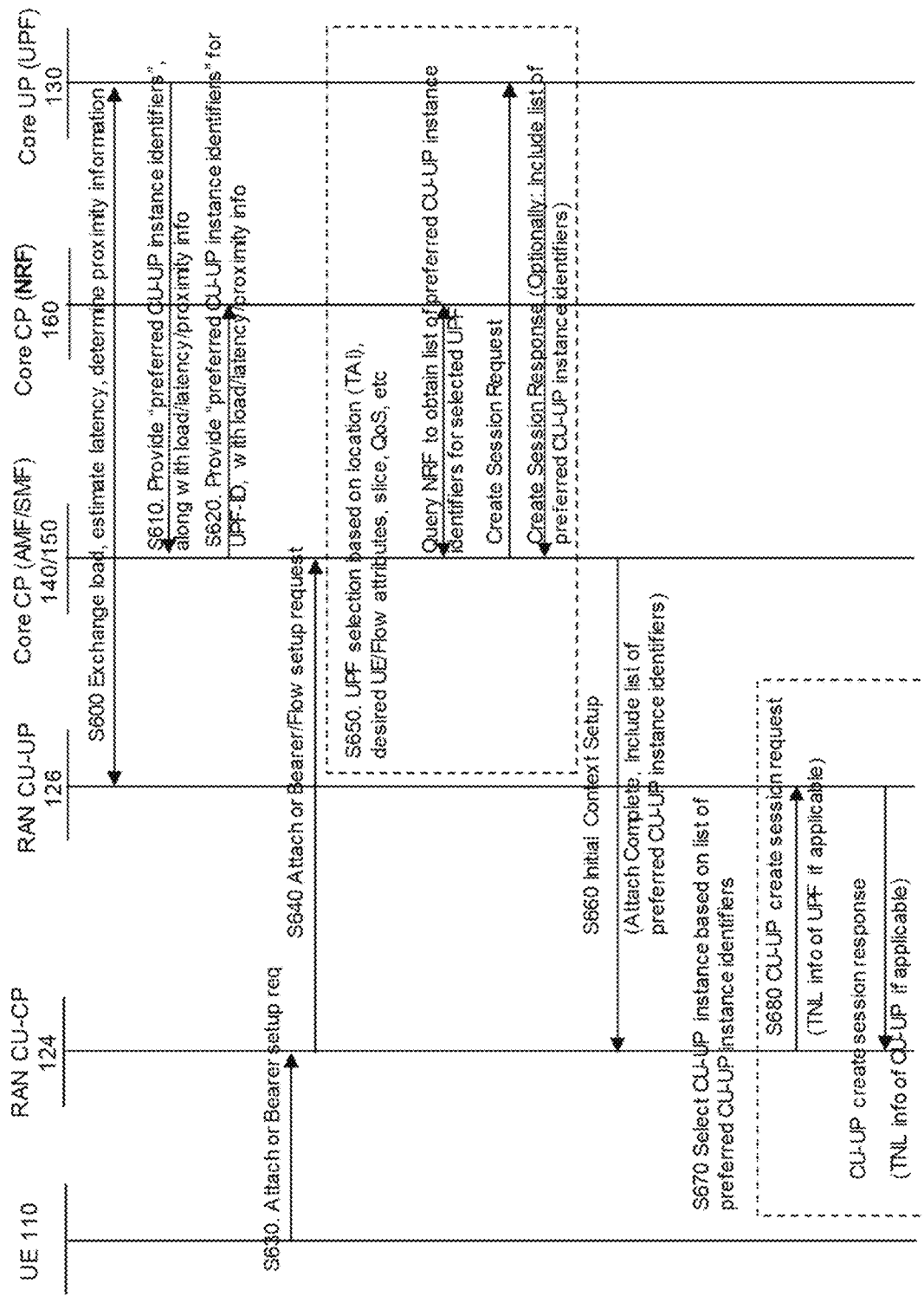

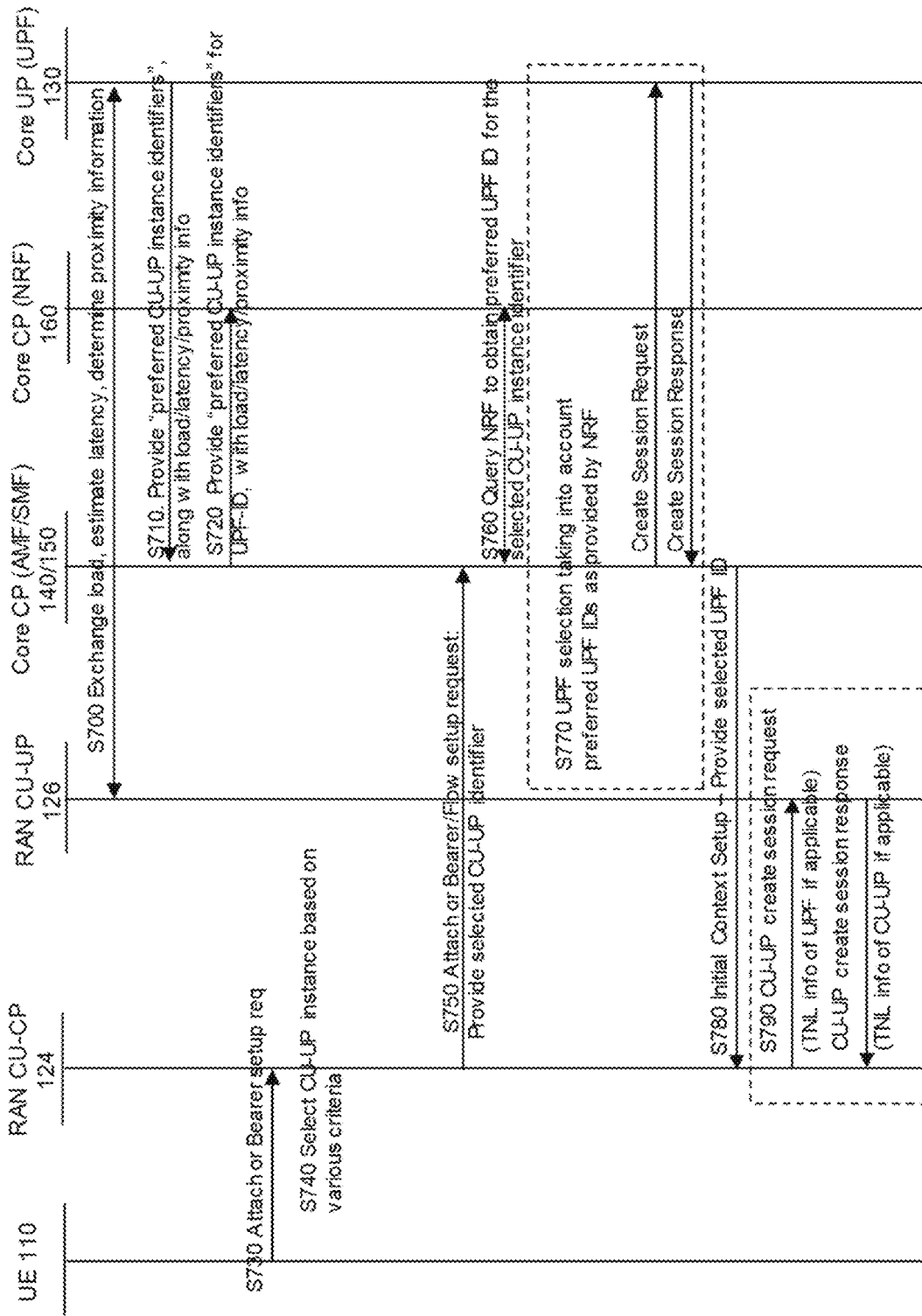

METHODS, APPARATUSES AND COMPUTER-READABLE STORAGE MEDIUMS FOR COORDINATED SELECTION OF RAN AND CORE USER PLANE COMPONENTS IN A WIRELESS COMMUNICATIONS NETWORK

CROSS-REFERENCE TO RELATED APPLICATIONS

This application is a national phase under 35 U.S.C. § 371 of PCT International Application No. PCT/US2018/018336 which has an International filing date of Feb. 15, 2018, the entire contents of each of which are hereby incorporated by reference.

BACKGROUND

Field

One or more example embodiments relate to methods, apparatuses and/or computer-readable storage mediums to coordinate selection of a radio access network (RAN) and core user plane (UP) components in a wireless communications network.

Discussion of Related Art

Developments in the Third-Generation Partnership Project (3GPP) 5th Generation networks have trended towards allowing a separation of user plane and control plane processing in the Radio Access Network (RAN) as well as a Core Network. The 5th Generation networks also allow different components to be placed at different locations in the network. It is expected that these networks will carry high volumes of data traffic, leading to a need for optimized processing of the data traffic in the network.

SUMMARY

Some example embodiments relate to a server associated with a core network. In some example embodiments, the server may include a memory storing computer-readable instructions; and at least one processor coupled to the memory, the at least one processor configured to execute the computer-readable instructions to, generate a list of preferred instances of a first network function, transmit the list of the preferred instances to a server associated with a third network function, and receive a request to establish a communication session with a selected instance selected from the list of the preferred instances, if the server is associated with a selected instance of a second network function associated with the selected instance of the first network function.

In some example embodiments, the first network function is a Centralized Unit-User Plane (CU-UP) function having a CU-UP instance associated therewith, the list of preferred instances is a list of preferred CU-UP instances configured to perform of the CU-UP function, and the selected instance is a selected CU-UP instance selected from the list of preferred CU-UP instances, the second network function is a User Plane Function (UPF) having a UPF instance associated therewith and the selected instance of the second network function is a selected UPF instance, and the third network function is at least one of a Session Management Function (SMF) having a SMF instance associated therewith and a Network Repository Function (NRF) Function having a NRF instance associated therewith.

In some example embodiments, the at least one processor is configured to exchange information with a Radio Access Network (RAN) server, the information including one or more of load information of each of the server and the RAN server, latency information of each of the server and the RAN server, and proximity information indicating a distance between the server and the RAN server.

In some example embodiments, the at least one processor is configured to generate the list of the preferred CU-UP instances based on the information exchanged with the RAN server.

In some example embodiments, the at least one processor is configured to at least one of: exchange information with the RAN server over an N3 interface, and transmit the list of the preferred CU-UP instances to the SMF instance over an N4 interface.

In some example embodiments, the at least one processor is configured to generate the list of the preferred CU-UP instances such that the preferred CU-UP instances are ones of a plurality of CU-UP instances that are one or more of (i) relatively closer to the server in regards to geographical or network topology and (ii) relatively lower in latency to the server as compared to other ones of the plurality of CU-UP instances.

In some example embodiments, the at least one processor is configured to run a UPF instance, the UPF instance being co-located with at least one of the plurality of CU-UP instances included in the list of the preferred CU-UP instances.

In some example embodiments, the server is configured to perform the UPF function for a user equipment (UE), and the selected CU-UP instance is configured to perform a CU-UP function for the UE.

In some example embodiments, the selected CU-UP is selected by the RAN server based on a distance between a Centralized Unit-Unit Plane (CU-CP) instance associated with the RAN server and the selected CU-UP instance associated and the selected UPF instance.

In some example embodiments, the selected CU-UP is co-located with the CU-CP instance associated with the RAN server.

Some other example embodiments relate to a server associated with a Radio Access Network (RAN). In some example embodiments, the server may include a memory storing computer-readable instructions; and at least one processor coupled to the memory, the at least one processor configured to execute the computer-readable instructions to, receive a list of preferred Centralized Unit-Unit Plane (CU-UP) instances from a server associated with a core network, select a selected CU-UP instance based on the list of the preferred CU-UP instances, and establish a communications session with the selected CU-UP instance.

In some example embodiments, the at least one processor is configured to, receive an identifier of a User Plane Function (UPF) instance from a server associated with the core network, and provide the identifier of the UPF instance to the selected CU-UP instance.

In some example embodiments, the at least one processor is configured to select the selected CU-UP instance such that the CU-UP instance is co-located with at least one Centralized Unit-Unit Plane (CU-CP) instance.

In some example embodiments, the list of the preferred CU-UP instances is generated based on information exchanged between the CU-UP instance in the RAN and a User Plane Function (UPF) instance in a Core Network.

In some example embodiments, the information exchanged between the RAN server and the Core Network includes one or more of load information of each of a server in the core network and the RAN server, latency information of each of the server in the core network and the RAN server, and proximity information indicating a distance between the server in the core network and the RAN server.

Some other example embodiments relate to another server associated with the core network. In some example embodiments, the server may include a memory storing computer-readable instructions; and at least one processor coupled to the memory, the at least one processor configured to execute the computer-readable instructions to, select a User Plane Function (UPF) instance from among a plurality of UPF instances, query a Network Repository Function (NRF) instance for a list of preferred Centralized Unit-User Plane (CU-UP) instances, and transmit the list of the preferred CU-UP instances to a Centralized Unit-Unit Plane (CU-CP) instance.

In some example embodiments, the CU-CP instance selects a selected CU-UP instance from among the list of the preferred CU-UP instances.

In some example embodiments, the at least one processor is configured to host a Session Management Function (SMF) instance.

In some example embodiments, the at least one processor is configured to, receive the list of the preferred CU-UP instances from one of the plurality of UPF instances, and transmit the list of the preferred CU-UP instances to the NRF instance prior to performing an attach procedure with a user equipment (UE).

In some example embodiments, the at least one processor is configured to, query the NRF instance for the list of the preferred CU-UP instances and transmit the list of the preferred CU-UP instances to the CU-CP instance after completing an attachment procedure with the UE.

BRIEF DESCRIPTION OF THE DRAWINGS

Some example embodiments will become more fully understood from the detailed description given herein below and the accompanying drawings, wherein like elements are represented by like reference numerals, which are given by way of illustration only and thus are not limiting of the example embodiments.

FIG. 6 is a signal flow diagram illustrating a procedure to enable coordinated selection of a UPF instance by an SMF and a CU-UP instance by the RAN, taking into account preferred relationships between certain instances of UPF and CU-UP, according to some example embodiments; and FIG. 7 is a signal flow diagram illustrating a procedure to enable coordinated selection of a UPF instance by an SMF and a CU-UP instance by the RAN, taking into account the preferred relationships between certain instances of UPF and CU-UP according to some example embodiments.

Figure 1:
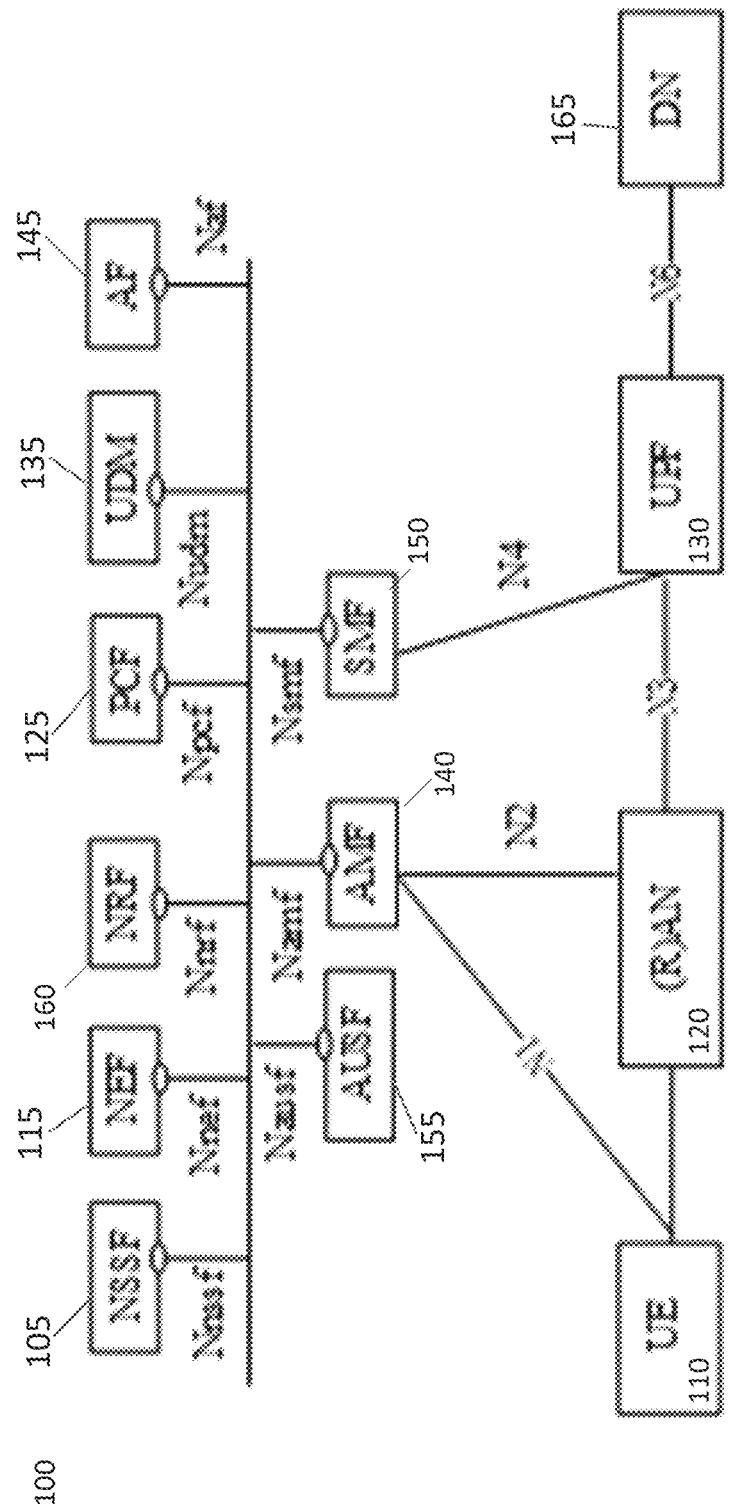
FIG. 1 illustrates a 3GPP 5G system architecture according to some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, the specific structural and functional details are merely representative for the purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of program code, software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

As disclosed herein, the term "memory," "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

According to example embodiments, schedulers, hosts, cloud-based servers, gNB, etc., may be (or include) hardware, firmware, hardware executing software or any combination thereof. In one example, a communications network may include a plurality of different radio interfaces, such as 3rd Generation (3G), 4th Generation (4G) and 5th Generation (5G) interfaces, Wireless Local Area Network (WLAN) standalone hotspots such as WiFi hotspots, and the like, across both the licensed and unlicensed spectra, as well as across macro cells, metro cells and femto cells.

The schedulers, hosts, servers, gNB, etc., may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, Mobility Management Entities (MMEs), controllers, gNBs, servers, client devices, etc.

While the procedures and embodiments are described primarily in the context of a 5G network, it should be noted that they are also applicable to networks following other systems and technologies, such as a fourth-generation or Long-Term (LTE) network.

Figure 2:
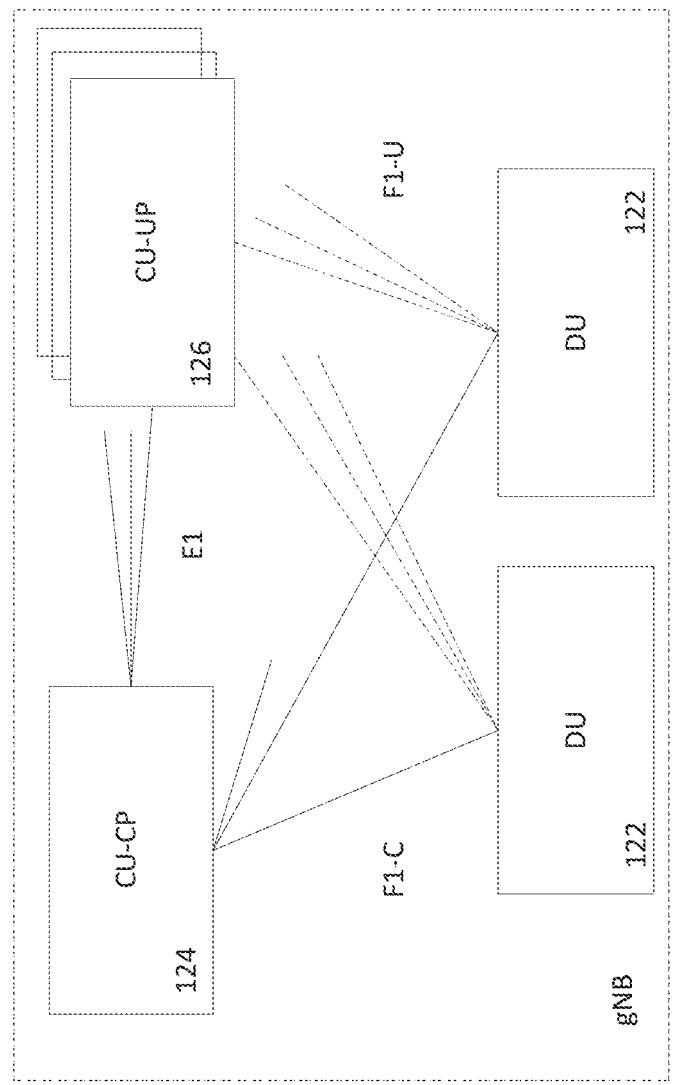
FIG. 2 illustrates a Radio Access Network (RAN) in a 5G network according to some example embodiments.
Figure 3:
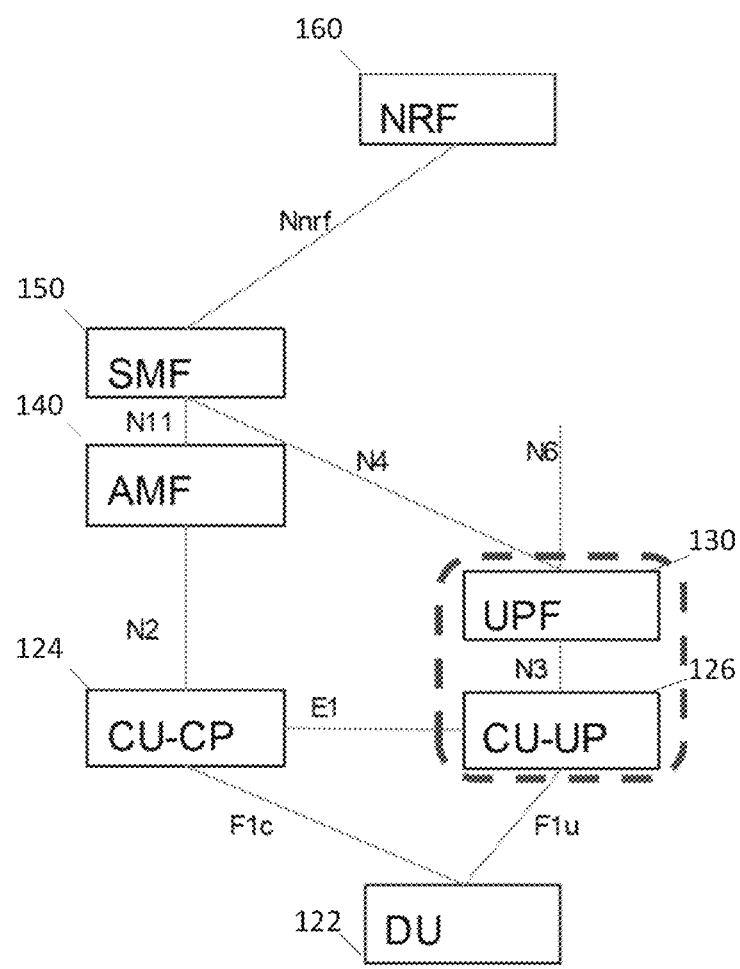
FIG. 3 illustrates a relevant portion of the 3GPP 5G system architecture according to some example embodiments.

FIG. 1 illustrates a 3GPP 5G system architecture according to some example embodiments. FIG. 2 illustrates a Radio Access Network (RAN) in a 5G network according to some example embodiments. FIG. 3 illustrates a relevant portion of the 3GPP 5G system architecture according to some example embodiments;

Referring to FIGS. 1 to 3, in a fifth generation (5G) communications system 100, functions, reference points, protocols and the like may be defined by network functions (NFs) rather than by hardware entities. The system 100 may be divided into various planes including a user plane (UP) and a control plane (CP).

The CP functions may include various functions to control a network and user equipments (UEs). UP functions may include various functions to control processing of data packets sent to or received from the UEs.

The system 100 may include a multitude of network elements in functions including UEs 110, a Radio Access Network (RAN) 120, a User Plane Function (UPF) 130, a Access and Mobility Management Function (AMF) 140, a Session Management Function (SMF) 150, and a Network Repository Function (NRF) 160. In addition the system 100 may include other elements as defined by 3GPP technical specification 23.501, the entire contents of which is hereby incorporated by reference in its entirety and illustrated in FIG. 1.

For example, the system 100 may also include a NSSF 105, NEF 115, PCF 125, UDM 135, AF 145, AUSF 155 and DN 165. The NSSF 105 provides a Network Slice Selection Function which is used for selecting a slice for a given user in a network that supports slicing. The NEF 115 is a Network Exposure Function that allows external elements to connect via Application Programming Interfaces (APIs) to various network functions. The PCF 125 is a Policy Control Function which enables policy-driven operation for the network. The UDM 135 is a Unified Data Management Function. The AF 145 is an application function that provides various services to user equipments. The AUSF 155 is an Authentication Server Function that handles authentication of user equipments attaching to the network. The DN 165 represents a Data Network, such as the Internet or a private content network. However, while these other elements are provided for the sake of completeness, these elements may not necessarily be relevant to the example embodiments, and thus, will not be discussed in more detail below.

The RAN 120 may have a user plane (UP) and a control plane (CP), and the Core Network may also have a User Plane (UP) and a control plane (CP).

The UPF 130 may be a part of the 5G core network, and may manage processing data packets sent to or from the UEs 110. The AMF 140 may be a part of the Control Plane (CP) of the 5G Core Network that performs access authentication and authorization when one of the UEs 110 attaches to the network, and may also perform mobility-related operations. The SMF 150 may be a part of the Control Plane (CP) of the 5G Core network that performs session-related functions, such as establishment/release of bearers, and also selects the UPF instance that should serve the data packets of a particular session associated with one of the UEs 110 or flow or bearer. The AMF 140 and the SMF 150 are part of what is referred to as a fifth generation core (5GC) control plane.

The NRF 160 may receive queries from other parts of the 5G system and provide types of information to the querying entities, for example relating to the attributes of a particular network element or network function or a group of UEs 110 or slices.

Referring to FIG. 2, the RAN 120 (also known as a gNB in 5G New Radio (NR) architecture, or as eNB in the LTE network, as described in 3GPP technical specification 38.300, the entire contents of which is hereby incorporated by reference in its entirety) may implement a radio access technology. The Radio Access Network may also be based on an air interface technology other than 5G, NR or LTE.

The RAN 120 may include a Distributed Unit (DU) 122 and a Centralized Unit (CU) as described in 3GPP specification 38.401, the entire contents of which is hereby incorporated by reference in its entirety. The CU may include a Centralized Unit-Control Plane (CU-CP) 124 and a Centralized Unit-User Plane (CU-UP) 126, as described in 3GPP technical report 38.806, the entire contents of which is hereby incorporated by reference in its entirety. The CU-UP 126 may perform functions related to the user-plane data (such as data packets) sent to or from user equipments, including ciphering/encryption, reordering/retransmission, multi-connectivity enabling a user equipment to connect to the network from multiple connection points, and the like. The CU-UP may perform control plane functions such as managing the user's radio connection, handovers, signal measurements, and the like.

The DU 122 may perform real-time processing of radio-related/baseband functions and the CU may perform non-real-time radio access network procedures such as Control Plane (CP) and User Plane (UP).

Collectively, the DU 122, CU-CP 124 and CU-UP 126 may be referred to herein as a New Radio NodeB (NR NodeB), gNodeB, a BS (Base Station), or a next generation node B (gNB) or an eNB (Evolved NodeB). The gNB can provide access to the 5G Core Network (5GC).

In some example embodiments, the function performed by the CU-UP 126 instance may be referred to as a first network function, the function performed by the UPF 130 instance may be referred to a second network function, and the function performed by the SMF 150 and/or the NRF 160 may be referred to as a third network function. However, the first to third network functions may not be limited to the CU-UP 126, the UPF 130 and the SMF/NRF 150, 160, respectively. For example, the first network function may be performed by any device capable of processing user-plane data for the UE 110 in one portion of the network, the second network function may be performed in various networks by any device capable of processing user-plane data for the UE 110 in another portion of the network, and the third network function may be performed in various networks by and device capable of performing the selection of (or, alternatively, providing information aiding in the selection of) a particular instance of the first or the second network function for processing the user-plane data of the UE 100. More generally, the first network function may be performed by any device capable of performing any operation in one portion of the network for the UE 110 (such as mobility event processing or security function processing or the like), and the second network function may be performed by any device capable of performing a related operation in another portion of the network for the UE 110, and the third network function may be performed by any device capable of performing a selection of or providing information aiding in the selection of a particular instance of the first or the second network function for performing the relevant operations for the UE 110.

Referring to FIG. 3, the various network functions may be connected via different interfaces. For example, within the RAN 120, an E1 interface (sometimes called an NGx interface) may connect the CU-CP 124 and CU-UP 126, an F1 Control plane F1c interface may connect the DU 122 and CU-CP 124, and an F1. User plane F1u interface may connect DU 122 and CU-UP 126. Further, an N2 interface and N3 interface may connect the RAN 120 and the 5G core network, for example, the N2 interface may connect the CU-CP 124 associated with the RAN 120 and the AMF 140 associated with the 5G core network, and the N3 interface may connect CU-UP 126 associated with the RAN 120 and the UPF 130 associated with the 5G core network.

If the Radio Access Network uses radio technologies other than LTE or 5G or New Radio (NR), typically a network function known as N3IWF may perform a similar role as the CU-UP 126. The N3IWF may be at least somewhat similar to the RAN 120. The N3IWF may inter-work so-called 'non-3GPP' access with the 5GC so that the 5GC treats this 'non-3GPP access' nearly identically as it does the '3GPP-access'. Details of the N3IWF are provided materially in 3GPP technical specification 23.502, the entire contents of which is hereby incorporated by reference in its entirety.

Further still, a N4 interface may connect the UPF 130 and the SMF 150, a N6 interface may connect the UPF 130 to a data network (e.g., Internet or a private content network), N11 interface may connect the AMF 140 and the SMF 150, and a Nnrf interface may connect functions within 5GC control plane (e.g., the SMF 150 and NRF 160).

Typically the instances of the UPF 130, AMF 140, SMF 150, and/or NRF 160 may be instantiated on one or more processors which may be part of one or more servers or other suitable network element apparatus. There may be multiple instances of each of these network functions in the network, and the different instances of the same network function and/or different ones of the network functions may be physically in different locations, such as in different racks within a data center, or within geographically separated data centers.

For example, the instances of CU-CP 124 and/or CU-UP 126 may be instantiated on a processor which may be part of a server or other suitable network element apparatus, and the CU-CP 124 and the CU-UP 126 instances can communicate with each other by the E1 interface.

Within the RAN 120, there can be multiple CU-UP 126 instances, and these CU-UP 126 instances may be placed at topologically different locations within the network. Having multiple instances of CU-UP 126 allows efficient load distribution and resiliency to failures. The CU-UP 126 instances may also be placed at different locations relative to each other, at different locations relative to CU-CP 124 instances, and at different locations relative to different DUs 122. This allows flexibility in selecting one of the CU-UP 126 instances to meet the needs of a given deployment scenario, given UE 110 and/or flow.

For any given one of the UEs 110, or for a particular bearer or flow of one of the UEs 110, the network 100 may select a particular UPF 130 instance as well as a CU-UP 126 instance to process the packets of that UE 110 or bearer or flow. The data flow of the packets sent by the UE 110 may flow from the UE 110 to the RAN 120 by flowing from the DU 122 to the selected CU-UP 126, and then to the selected UPF 130 and out to the other endpoint of the flow, which may be in the internet for example.

The selection of the CU-UP 126 instance from among multiple available CU-UP 126 instances is typically done by the CU-CP 124, and the selection of the UPF 130 instance is typically done by the SMF 150. These respective selection decisions may in general use very different criteria and may be based on very different information.

For example, the selection by the CU-CP 124 of a CU-UP 126 may be based on the information available in the RAN 120 at the CU-CP 124, and may be based on criteria such as proximity to the DUs 122 to which UEs 110 are connected, radio conditions, throughput or other load conditions at various CU-UP 126 instances, backhaul bandwidth limitations at various parts of the RAN 120, etc. In contrast, the selection by the SMF 150 of the UPF 130 may be based on information available at the SMF 150, which may be very different from the information available at the RAN 120 or CU-CP 124 therein. For example, the SMF 150 may be aware of the identity of the UE 110 and additional information related to the user's subscription profile and authorization, as well as requested end-to-end bearer attributes, whereas this information is typically not available at the RAN 120 and/or at the CU-CP 124.

Further, the SMF 150 may use criteria for selection that are very different from the RAN 120. For example, the SMF 150 may be unaware of the radio conditions or the throughput or the path constraints such as backhaul bandwidth limitations in the RAN 120. Thus, conventionally, there may be no coordination between the CU-CP 124 and the SMF 150 when the CU-CP 124 selects the CU-UP 126 and the SMF 150 selects the UPF 130.

In some deployments, the UPF 130 instance may be closely associated with a particular CU-UP 126 instance. For example, the UPF 130 instance may be collocated with or at a low latency from the CU-UP 126 instance. For example, both the UPF 130 and the CU-UP 126 may be instantiated on the same physical processor, or same physical server, or servers within the same data center, or in the same edge cloud, or on the same network subnet, etc. There are several advantages to such deployments. For example, such a deployment would allow a packet to flow in an optimized way through the CU-UP processing and the UPF processing with very low overhead, providing a highly optimized user plane crossing the RAN 120 and the Core network. The N3 interface between the UPF 130 and the CU-UP 126 may be implemented in a highly optimized fashion. The UPF 130 and CU-UP 126 may be closely associated to the extent that a single network element may be capable of performing the functions of both UPF 130 and CU-UP 126.

In view of the above, the management of the network is significantly simplified. Further, the latency experienced by a packet when flowing through the UPF 130 and the CU-UP 126 can be very low, due to the optimized processing and/or low latency between the UPF 130 and the CU-UP 126. Further, such example embodiments can have very high capacity, due to the potential elimination of overheads in processing packets and passing the processed packets from the UPF 130 to the CU-UP 126, as well as lower cost due to the reduced need for intermediate switches, routers and transport links between the UPF 130 and the CU-UP 126.

While as discussed above, the CU-UP and the UPF 130 may be closely associated, such optimization may also be performed with the UPF 130 and the N3IWF for situations where the UEs 110 connect with radio access technologies other than LTE, 5G or NR, and similar advantages can be obtained from that as well.

In the aforementioned example, from the perspective of the UPF 130 instance, the closely associated CU-UP 126 instance may likely be a preferred instance, and vice-versa. That is, from the perspective of the UPF 130 instance, if the UPF 130 instance is selected for processing a flow or bearer of the UE 110, then it is preferable or desirable that the closely associated CU-UP 126 instance also be selected in a coordinated way for processing the flow or bearer of the UE 110 in the RAN. In some embodiments, a UPF 130 instance may have multiple preferred CU-UP 126 instances, and vice-versa.

However, conventionally, the SMF 150 may select a particular UPF 130 that is closely associated with a preferred CU-UP 126 instance but the CU-CP 124 may select a different CU-UP 126 instance other than the preferred CU-UP 126 instance, because this selection by the CU-CP 124 is not coordinated with the SMF 150 and preferred instances are not evaluated. Therefore, the UPF 130 instance and a different CU-UP 126 instance may be selected leading to a sub-optimal flow of packets therebetween. For example, as discussed above, each of the UPF 130 instance and the selected CU-UP 126 instance (other than the preferred CU-UP 126 instance) may be placed at topologically different locations within the network, for example within different racks within a data center, or within geographically separated data centers such that there may be unnecessary latency and overhead in packets transmitted therebetween.

Figure 4:
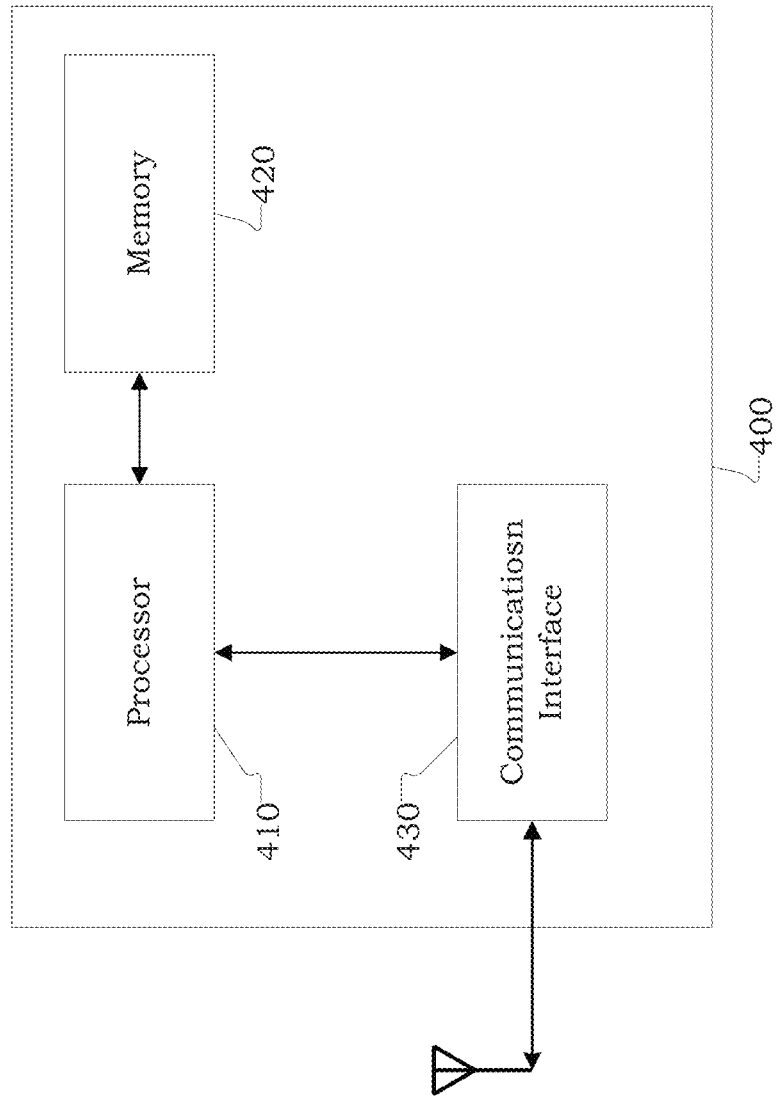
FIG. 4 is a block diagram illustrating the structure of a server associated with a radio access network (RAN) according to some example embodiments.

FIG. 4 is a block diagram illustrating the structure of a server associated with a radio access network (RAN) according to some example embodiments.

Referring to FIG. 4, a server 400 associated with the RAN 120 may include at least one processor 410 (referred to hereinafter in singular form); a memory 420; and a communications interface 430.

The processor 410 is operatively coupled to the memory 420 and the communications interface 430.

The processor 410 may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA). The processor may be configured, through a layout design or execution of computer readable instructions stored in the memory 420, as a special purpose computer to perform the functions of the DU 122, CU-CP 124 or the CU-UP 126. Therefore, a server associated with the radio access network RAN 120 may be a server configured to host the CU-CP 124, for example.

While FIG. 4 illustrates a single server 400, one of ordinary skill in the art will readily appreciate that each of the DU 122 instance, CU-CP 124 instance and the CU-UP 126 may be hosted on different servers 400 each having the structure illustrated in FIG. 4.

The memory 420 includes at least one of a volatile memory, non-volatile memory, random access memory (RAM), a flash memory, a hard disk drive, and an optical disk drive.

The communications interface 430 may include various interfaces including one or more transmitters/receivers connected to one or more connections or antennas to respectively transmit/receive (wireline and/or wirelessly) signals.

Figure 5:
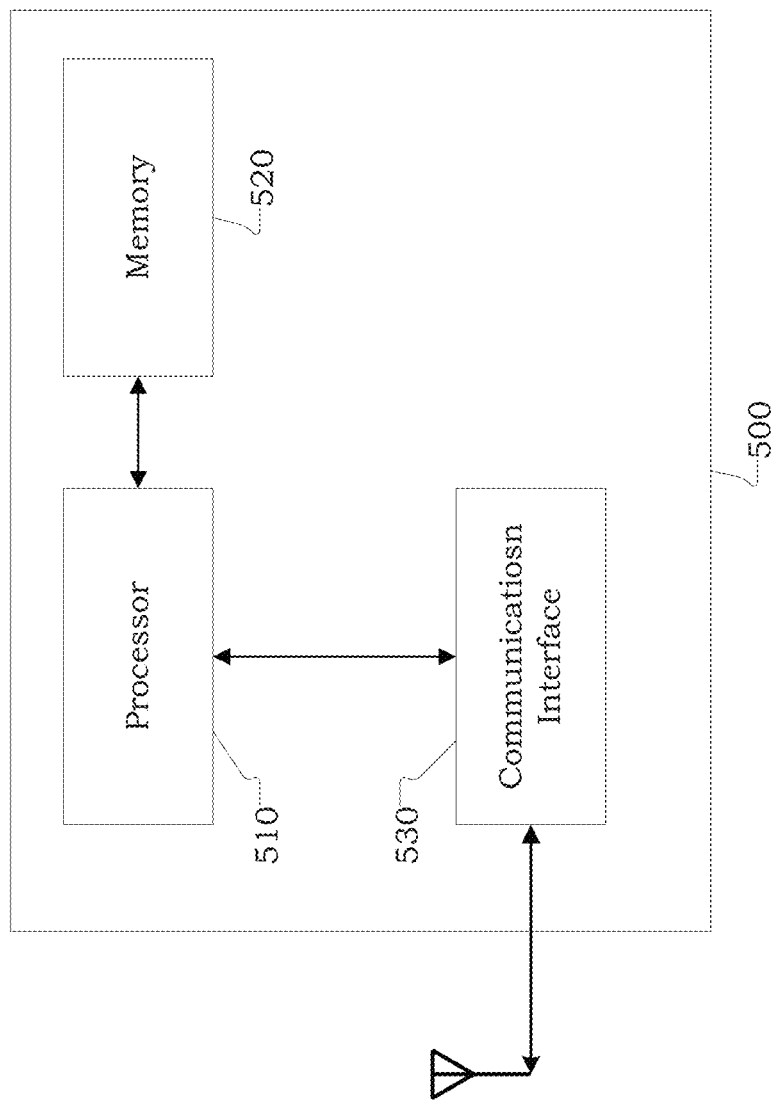
FIG. 5 is a block diagram illustrating the structure of a server associated with a core network according to some example embodiments.

FIG. 5 is a block diagram illustrating the structure of a server associated with a core network according to some example embodiments.

Referring to FIG. 5, a server 500 associated with the core network may include at least one processor 510 (referred to hereinafter in singular form); a memory 520; and a communications interface 530.

The processor 510 is operatively coupled to the memory 520 and the communication interface 530.

The processor 510 may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA). The processor may be configured, through a layout design or execution of computer readable instructions stored in the memory 520, as a special purpose computer to perform the functions of the UPF 130, the AMF 140, or the SMF 150. Therefore, a server associated with the core network may be a server configured to host the UPF 130 or a server configured to host the SMF 150, for example.

While FIG. 4 illustrates a single server 400, one of ordinary skill in the art will readily appreciate that each of the UPF 130, the AMF 140, and the SMF 150 may be hosted on different servers 500 each having the structure illustrated in FIG. 5.

The memory 520 includes at least one of a volatile memory, non-volatile memory, random access memory (RAM), a flash memory, a hard disk drive, and an optical disk drive.

The communications interface 530 may include various interfaces including one or more transmitters/receivers connected to one or more connections or antennas to respectively transmit/receive (wired and/or wireless) signals.

FIG. 6 is a signal flow diagram illustrating a procedure to enable coordinated selection of a UPF instance by an SMF and a CU-UP instance by the RAN, taking into account preferred relationships between certain instances of UPF and CU-UP, according to some example embodiments.

Referring to FIG. 6, in operation S600, the UPF 130 and the CU-UP 126 within the RAN 120 may collect and exchange information at appropriate events and/or periodically. For example, the UPF 130 and the CU-UP 126 may exchange load, latency, and proximity information. In some example embodiments, the UPF 130 and the CU-UP 126 may exchange this information over the N3 interface using additional information elements.

The proximity information may include information related to a geographical or network topology. For example, information indicating whether the UPF 130 and the CU-UP 126 are part of the same subnet, physical hardware, edge cloud domain, etc.

In operation S610, the UPF 130 may create (or, alternatively, update) a list of identifiers identifying preferred CU-UP 126 instances, and may provide the list of preferred CU-UP identifiers to the SMF 150 via the N4 interface. Along with the list of preferred CU-UP identifiers, the UPF 130 may also provide the SMF 150 with the information related to load, latency and proximity between the UPF 130 and the respective ones of the CU-UPs 126.

In operation S620, the SMF 150 may transmit the list of preferred CU-UP identifiers and the collected information to the NRF 160 via the Nnrf interface.

In other example embodiments, operations S610 and S620 may be combined in a single operation in which the UPF 130 communicates with the NRF 160 directly via a new interface (not shown) between the UPF 130 and the NRF 160, or via an existing Nnrf interface supported by the NRF 160, to transmit the list of preferred CU-UP instance identifiers and the collected information, or the CU-UP 126 may communicate directly with the NRF 160 via a new interface (not shown) between the RAN 120 and the NRF 160, or via an existing Nnrf interface supported by the NRF 160. In other example embodiments, rather than levering new interfaces, network functions, such as the SMF 150 and/the CU-CUP 126 may be modified to interact with the NRF 160 using the Nnrf service access point (SAP).

In operation S630, the UE 110 may perform an attach procedure, by sending an Attach request, or may request the creation of a new bearer by sending a bearer setup request to the network 100.

In operation S640, the CU-CP 124 may transmit an Attach or Bearer/Flow setup Request to the AMF 140, which in turn may notify the SMF 150 of the request by one of the UEs 110 to set up a session.

In operation S650, the SMF 150 may select a UPF 130 to process the data flow of the UE 110. This selection may be based on various attributes or criteria, which may for example correspond to the user device such as location (TAI), desired UE/flow attributes, slice, Quality of Service (QoS), etc., or based on load-balancing criteria amongst multiple UPF instances.

Pursuant to the selection of the UPF 130, the SMF 150 may query the NRF 160 for the list of preferred CU-UP identifiers associated with the selected UPF 130 over the Nnrf interface. In some example embodiments, the SMF 150 instance which queries the NRF 160 may not necessarily be the same SMF 150 instance that updated the NRF in operation S620. Thereafter, the SMF 150 may transmit a create session request to the UPF 130 in order to notify the UPF 130 that it has been selected to process the flow of data for the UE 110, and receive a create session response from the UPF 130 via the N4 interface. In some example embodiments, the create session response from the UPF 130 may include a list of preferred CU-UP instance identifiers.

In operation S660, the SMF 150 may transmit an Initial Context Setup to the CU-CP 124 to notify the RAN 120 of the completion of the Attach Procedure on the Core network side, and can provide the selected UPF identifier and provide the RAN 120 with one or more preferred CU-UP identifiers via the N2 interface.

In operation S670, the CU-CP 124 may select a particular CU-UP 126 instance based on the list of preferred CU-UP identifiers. This selection of the CU-UP 126 instance by the CU-CP 124 may use the list of preferred CU-UP instance identifiers in addition to the criteria the CU-CP 124 would normally use, or in replacement of the criteria the CU-CP 124 would normally use.

In other example embodiments, instead of the SMF 150 querying the NRF 160 to obtain a list of preferred CU-UP instance identifiers for the selected UPF 130 instance and providing the list to the CU-CP 124 in operation S670, the CU-CP 124 may directly query the NRF 160 via a new interface (not shown) between the RAN 120 and the NRF 160 in order to obtain the list of preferred CU-UP instance identifiers for the selected UPF 130 whose identifier was provided to the CU-CP in operation S670.

In operation S680, following the decision to select the CU-UP 126 instance, the CU-CP 124 may transmit a create session request to the selected CU-UP 126 to notify the CU-UP 126 that it has been selected to process the flow of packets for the UE 110, and receive a create session response from the CU-UP 126 over the E1 interface. The CU-CP 124 may provide an identifier or other information regarding the selected UPF instance 130 in the create session request. The CU-UP 126 may then create session context for the flow or bearer of the UE 110, and may use the knowledge of the identifier of the UPF 130 to invoke special optimizations for the user-plane processing that would support the advantages mentioned earlier, such as lower latency for the packet flow. This enables the UE 110 to attach to the network 100 and be provided an optimized user-plane processing path for its data flow traversing the UPF 150 and the preferred CU-UP 126 instance.

Therefore, by performing the procedure described with reference to FIG. 6, the SMF 150 and the CU-CP 124 may make a coordinated selection of the UPF 130 and the CU-UP 126 respectively, in such a manner that the CU-UP 126 instance chosen by the CU-CP 124 is one of the preferred CU-UP 126 instances for that UPF 130. This enables the network 100 to obtain all the benefits of user-plane optimization mentioned earlier, such as lower latency, lower processing overhead, and lower cost.

It should be noted that while the above example illustrates the coordinated selection of UPF 130 and CU-UP 126 instances as occurring at the time the UE 110 attaches to the network, the coordinated selection of UPF 130 and CU-UP 126 instances may also be performed at any suitable instances or events, such as a handover or tracking area update or mobility event of the UE 110, or addition of a new flow or bearer, or creation of a new slice in the network, or the like.

FIG. 7 is a signal flow diagram illustrating a procedure to enable coordinated selection of a UPF instance by an SMF and a CU-UP instance by the RAN, taking into account the preferred relationships between certain instances of UPF and CU-UP according to some example embodiments.

Referring to FIG. 7, in some example embodiments, the order in which the operations may be executed differently relative to the example embodiment illustrated in FIG. 6. For example, the RAN CU-CP 124 may select the CU-UP 126 instance prior to the SMF 150 selecting the UPF 130 instance while still enabling coordinated selection of the UPF 130 and the CU-UP 126 by the SMF 150 and the CU-CP 124 respectively.

Operation S700 to operation S730 may be substantially similar to operations S600 to S630, discussed supra, and, thus for the sake of brevity, repeated descriptions will not be included herein.

In operation S740, the CU-CP 124 may select a CU-UP 126 instance based on various criteria suitable for the RAN 120, such as radio conditions, bandwidth limitations in the backhaul network, latency or proximity between the CU-UP 126 and the DU 122 to which the UE 110 is connected, and the like.

In operation S750, the CU-CP 124 may transmit, via the N2 interface, the attach request from the UE 110 to the Core network (e.g., the AMF 140 or the SMF 150) such that the attach request further includes an identifier of the selected CU-UP 126 instance.

In operation S760, the SMF 150 may query, via the Nnrf interface, the NRF 160 to obtain a list of UPF 130 instance identifiers for whom the selected CU-UP instance 126 is a preferred CU-UP instance.

In some example embodiments, the SMF 150 instance which queries the NRF 160 may not necessarily be the same SMF 150 instance that updated the NRF in operation S720.

Thereafter, at operation S770 the SMF 150 may select a UPF instance identifier taking into account the UPF 130 instances for whom the selected CU-UP 126 instance is a preferred identifier, along with other criteria such as location or tracking area, load-balancing, the needs of the bearer or flow for the user equipment 110, and the like. Further, the SMF 150 may transmit, via the N4 interface, a create session request to the UPF 130 and receive a create session response from the UPF 130.

In operation S780, the SMF 150 or AMF 140 may transmit, via the N4 interface, an initial context setup to the CU-CP 124 indicating attachment is complete, and may additionally include an indication of whether the UPF 130 instance selected by the SMF 150 has the originally selected CU-UP 126 instance as a preferred CU-UP 126 instance or not, or an indication of whether the CU-CP 124 should select a different CU-UP 126 instance compared to the originally selected CU-UP 126 instance.

Depending on this additional indication, the CU-CP 124 may select a different CU-UP 126 instance, or continue with the originally selected CU-UP 126 instance. The CU-CP 124 may then transmit, via the E1 interface, a create session request to the selected CU-UP 126 instance. The create session request may include information related to the UPF 130, such as a tunnel endpoint identifier sometimes known as TNL information. The CU-UP 126 may transmit, via the E1 interface, a create session response to the CU-CP 124. The create session response may include TNL info of the CU-UP 126.

In operation S790, the CU-UP 126 may create a session context for the flow or bearer of the UE 110, and may also invoke special optimized processing of the packet flows towards the indicated UPF 130 as described earlier. This enables the UE 110 to attach to the network and be provided an optimized user-plane processing path for its data flow traversing the UPF 150 and the preferred CU-UP 126 instance.

Therefore, by performing the procedure described with reference to FIG. 7, the SMF 150 and the CU-CP 124 may coordinate selection of the UPF 130 and the CU-UP 126 respectively, in such a manner that the CU-UP 126 instance chosen by the CU-CP 124 is one of the preferred CU-UP 126 instances for that UPF 130. This enables the network to obtain all the benefits of user-plane optimization mentioned earlier, such as lower latency, lower processing overhead, and lower cost.

As discussed above, in one or more example embodiments, selection of a particular UPF 130 by the SMF 130, and selection of a particular CU-UP 126 instance by the CU-CP 124 may be coordinated such that the selected UPF 130 instance and CU-UP 126 instance pair may be improved (or, alternatively, optimized).

As discussed above, example embodiments may be implemented over standard interfaces between various ones of the instances in the 5G network. Alternatively, as discussed above, in one or more other example embodiments, a new interface may be established to allow direct communication between the UPF 130 and the NRF 160 to allow the UPF 130 to directly provide the NRF 160 with the list of preferred CU-UP identifiers. Further still, in one or more other example embodiments, a new interface may be established to allow direct communication between the CU-CP 124 and the NRF 160 to allow the CU-CP 124 to query the NRF 160 to obtain preferred CU-UP instance identifiers for a selected UPF 130. Yet other embodiments may be implemented in which the SMF 150 may query the NRF 160 by providing a selected CU-UP 126 instance identifier and obtain from the NRF a list of UPF instance identifiers for which the selected CU-UP 126 instance identifier is a preferred CU-UP instance.

In some cases, for example where the UE 110 connects to the network by a different radio access technology and an N3IWF is used to process the user-plane packet flow to and from the UE 110, the above methods may be used to effect a coordinated selection of the UPF 130 instance identifier by the core network and the selection of the N3IWF instance by the radio access network. In some example embodiments, the UPF 130 instance may be placed in a manner coordinated with the placement of the CU-UP 126 instance, thereby enabling the two to be closely associated and harness the potential benefits therefrom. This placement is typically performed by an orchestration decision, and this orchestration may also be coordinated across the RAN and Core networks. In some example embodiments, the NRF 160 that is queried variously by the SMF 150 or the CU-UP 126 or interfaced to by the UPF 130 or the CU-UP 126 may be distributed in various places with data replication or other techniques, to enable high scalability and fault tolerance.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A server associated with a core network, the server comprising:
    a memory storing computer-readable instructions; and
    at least one processor coupled to the memory, the at least one processor configured to execute the computer-readable instructions to,
        generate a list of preferred instances of a first network function,
        transmit the list of the preferred instances to a server associated with a third network function, and
        receive a request to establish a communication session with a selected instance selected from the list of the preferred instances, if the server is associated with a selected instance of a second network function associated with the selected instance of the first network function.

2. The server of claim 1, wherein
    the first network function is a Centralized Unit-User Plane (CU-UP) function having a CU-UP instance associated therewith, the list of preferred instances is a list of preferred CU-UP instances configured to perform of the CU-UP function, and the selected instance is a selected CU-UP instance selected from the list of preferred CU-UP instances,
    the second network function is a User Plane Function (UPF) having a UPF instance associated therewith and the selected instance of the second network function is a selected UPF instance, and
    the third network function is at least one of a Session Management Function (SMF) having a SMF instance associated therewith and a Network Repository Function (NRF) Function having a NRF instance associated therewith.

3. The server of claim 2, wherein the at least one processor is configured to exchange information with a Radio Access Network (RAN) server, the information including one or more of load information of each of the server and the RAN server, latency information of each of the server and the RAN server, and proximity information indicating a distance between the server and the RAN server.

4. The server of claim 3, wherein the at least one processor is configured to generate the list of the preferred CU-UP instances based on the information exchanged with the RAN server.

5. The server of claim 3, wherein the at least one processor is configured to at least one of:
    exchange information with the RAN server over an N3 interface, and
    transmit the list of the preferred CU-UP instances to the SMF instance over an N4 interface.

6. The server of claim 2, wherein the at least one processor is configured to generate the list of the preferred CU-UP instances such that the preferred CU-UP instances are ones of a plurality of CU-UP instances that are one or more of (i) relatively closer to the server in regards to geographical or network topology and (ii) relatively lower in latency to the server as compared to other ones of the plurality of CU-UP instances.

7. The server of claim 6, wherein the at least one processor is configured to run a UPF instance, the UPF instance being co-located with at least one of the plurality of CU-UP instances included in the list of the preferred CU-UP instances.

8. The server of claim 2, wherein the server is configured to perform the UPF function for a user equipment (UE), and the selected CU-UP instance is configured to perform a CU-UP function for the UE.

9. The server of claim 8, wherein the selected CU-UP is selected by the RAN server based on a distance between a Centralized Unit-Unit Plane (CU-CP) instance associated with the RAN server and the selected CU-UP instance associated and the selected UPF instance.

10. The server of claim 9, wherein the selected CU-UP is co-located with the CU-CP instance associated with the RAN server.

11. A server associated with a Radio Access Network (RAN), the server comprising:
a memory storing computer-readable instructions; and
at least one processor coupled to the memory, the at least one processor configured to execute the computer-readable instructions to,
receive a list of preferred Centralized Unit-User Plane (CU-UP) instances from a server associated with a core network, the list of preferred CU-UP instances containing preferred CU-UP instances,
select a selected CU-UP instance based on the list of preferred CU-UP instances, and
establish a communications session with the selected CU-UP instance
receive an identifier of a User Plane Function (UPF) instance from a server associated with the core network, and
provide the identifier of the UPF instance to the selected CU-UP instance.

12. The server of claim 11, wherein the at least one processor is configured to select the selected CU-UP instance such that the CU-UP instance is co-located with at least one Centralized Unit-User Plane (CU-CP) instance.

13. The server of claim 11, wherein the list of preferred CU-UP instances is generated based on information exchanged between the CU-UP instance in the RAN and a User Plane Function (UPF) instance in a Core Network.

14. The server of claim 13, wherein the information exchanged between the RAN server and the Core Network includes one or more of load information of each of a server in the core network and the RAN server, latency information of each of the server in the core network and the RAN server, and proximity information indicating a distance between the server in the core network and the RAN server.

15. A server associated with a core network, comprising:
a memory storing computer-readable instructions; and
at least one processor coupled to the memory, the at least one processor configured to execute the computer-readable instructions to,
select a User Plane Function (UPF) instance from among a plurality of UPF instances,
query a Network Repository Function (NRF) instance associated with the selected UPF instance for a list of preferred Centralized Unit-User Plane (CU-UP) instances, the list of preferred CU-UP instances containing preferred CU-UP instances, and
transmit the list of preferred CU-UP instances to a Centralized Unit Control Plane (CU-CP) instance.

16. The server of claim 15, wherein the CU-CP instance selects a selected CU-UP instance from among the list of preferred CU-UP instances.

17. The server of claim 15, wherein the at least one processor is configured to host a Session Management Function (SMF) instance.

18. The server of claim 15, wherein the at least one processor is configured to,
receive the list of preferred CU-UP instances from one of the plurality of UPF instances, and
transmit the list of preferred CU-UP instances to the NRF instance prior to performing an attach procedure with a user equipment (UE).

19. The server of claim 18, wherein the at least one processor is configured to,
Query the NRF instance for the list of preferred CU-UP instances and transmit the list of preferred CU-UP instances to the CU-CP instance after completing an attachment procedure with the UE.

* * * * *